No. 834,425. PATENTED OCT. 30, 1906.
W. A. WEBSTER.
VALVE GEAR.
APPLICATION FILED SEPT. 11, 1905.
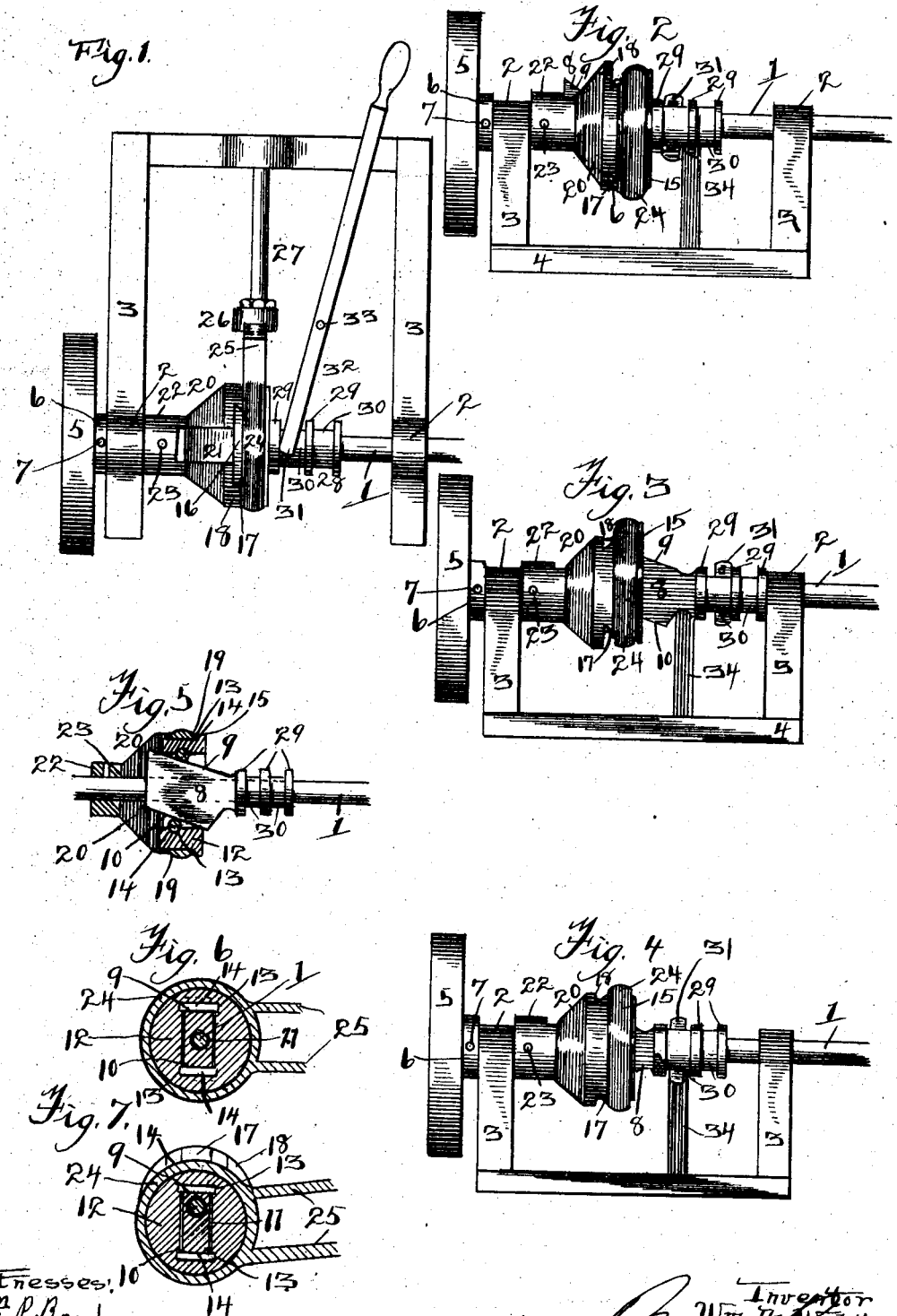

UNITED STATES PATENT OFFICE.

WILLIAM A. WEBSTER, OF MONMOUTH, ILLINOIS.

VALVE-GEAR.

No. 834,425.  Specification of Letters Patent.  Patented Oct. 30, 1906.

Application filed September 11, 1905. Serial No. 277,945.

*To all whom it may concern:*

Be it known that I, WILLIAM A. WEBSTER, a citizen of the United States, residing at Monmouth, in the county of Warren and State of Illinois, have invented certain new and useful Improvements in Valve-Gear, of which the following is a specification.

The invention relates to valve-gear of that type in which an eccentric relation can be established between the engine or power and the driven shaft for transmitting motion and power to the shaft under varying conditions as to speed of revolution.

The objects of the invention are to simplify and improve the mounting of the actuating devices for obtaining the eccentricity; to furnish a slidable incline mounted on the driven shaft and supporting a movable center carrying the band or ring of the eccentric with the movable center in juxtarelation to a fixed guide or support, by which the eccentric ring or band is held in position; to obviate to a great extent the friction between the shifting incline or wedge and the movable center by means of interposed rollers between the two, and to improve generally the construction, arrangement, and operation of the several elements entering into the formation of the device as a whole.

The invention consists in the features of construction and combinations of parts hereinafter described and claimed.

In the drawings, Figure 1 is a top or plan view with the incline or wedge advanced to the limit in one direction; Fig. 2, a side elevation with the parts or elements as in Fig. 1, showing the eccentric ring or band in its outermost position; Fig. 3, a side elevation showing the incline or wedge retracted from its advanced position to change the throw of the eccentric and the piston or other rod connected therewith; Fig. 4, a side elevation with the incline or wedge set so as to produce a concentric relation between the band or loop and its carrying center instead of an eccentric relation between the two; Fig. 5, a sectional elevation of the movable center, the eccentric band or loop, and the fixed support; Fig. 6, a cross-section through the incline or wedge, the movable center, and the eccentric loop or band, showing the parts in normal position; and Fig. 7, a cross-section of the parts shown in Fig. 6, with the wedge advanced to carry the movable center and the encircling band or loop off center in relation to the shaft.

The construction shown has a driving-shaft 1, mounted in suitable journal boxes or bearings 2 on side supports 3, extending up from a base 4; but the shaft can be mounted as may be required for the use and purpose for which it is intended. The shaft at one end has a pulley or driving-wheel 5, with a hub 6 secured to the shaft by a pin 7, passing through the hub and the shaft, or in any other suitable manner.

A wedge or incline 8 is slidably mounted on the shaft 1, and this wedge or incline has engaging faces 9 and 10, bringing the opposite points of the wedge or incline at the front and rear ends equidistant from the center of the shaft and a greater distance than the other two diagonal corners of the wedge or incline, as shown in Fig. 5. The shiftable wedge or incline 8 is located and slidable within a slot or channel 11 in a disk or center 12, and at each end of the slot or channel 11 in the body of the disk or center 12 is a semicircular depression or recess 13, in each of which is located a roller 14, having a bearing contact against the inclined faces 9 and 10 of the wedge, as shown in Figs. 5, 6, and 7. These rollers furnish an antifrictional bearing between the wedge and the movable disk or center, by which the endwise movement of the wedge is reduced to a minimum as regards friction between the wedge and the movable disk or center, thus enabling the wedge to be readily and quickly shifted on the shaft. The disk or center 12 on one side has a circumferential flange 15 projecting above the normal face of the disk or center, so as to furnish a stop for the loop or band which encircles the body of the movable disk or center. The opposite face of the disk or center 12 to the rim or flange 15 has a tongue or spline 16 with beveled side edges or faces, which tongue or spline enters a groove 17, with beveled sides formed in a head 18 of a diameter to correspond or nearly so with the diameter of the rim or flange 15 for the edge of the head to form a shoulder or abutting face to complete the channel 19, receiving the loop or strap of the rod. The slot or channel 11 extends through the tongue or spline 16, and in line therewith is a slot or channel 21 in the head 20 to permit the sliding cam or wedge 8 to be advanced and receded. The head 20 has a neck or collar 22 integral therewith, and this neck or collar is fixedly attached to the shaft 1 by means of a cross-pin 23 passing through the collar and the shaft, so that the head has a fixed relation and by its rotation will drive the shaft.

A strap or band 24 encircles the exterior of the disk or center 12 and lies within the channel 19 between the shoulders formed by the projecting edges of the rim or flange 15 and the head 20, and this strap 24 has a neck or extension 25, receiving a lock or jam nut 26, by means of which it is connected with the end of the piston-rod or pitman 27 of an engine or other source of power. (Not shown.) The cam or wedge 8 at one end has a sleeve or collar 28 with circumferential flanges or rings 29, forming annular grooves 30, adapted to receive the forked end 31 of a lever 32, pivotally mounted by a pin or pivot 33 on the end of a post or standard 34, extending up from the base 4, so that by turning the lever 32 on its pivot the cam or wedge 8 can be advanced and receded for its inclined faces 9 and 10 through the contact with the antifriction-rollers 14 to shift the eccentricity of the disk or center 12 in relation to the shaft 1 to increase or decrease the power applied for revolving the shaft. It will be understood that the tongue or spline 16, in connection with the disk or center 12, forms a crank for transmitting power to the head 20 for revolving the shaft.

The operation will be understood from the foregoing description, but briefly is as follows: The operator, through the lever 32 and its fork 31, advances and recedes the cam or wedge 8 bodily on the shaft 1, and by so doing causes the inclined faces 9 and 10, through their engagement with the antifriction-rollers, to throw the disk or center 12 in eccentric relation to the shaft more or less. The advance of the cam or wedge to the limit of its forward movement sets the disk or center 12 and its encircling strap or band 24 in eccentric relation to the shaft, so as to apply a limited power for driving the shaft and giving a slow speed, and the operator by sliding the cam or wedge to the limit of its receding movement sets the disk or center and its encircling strap or band at the point of greatest eccentricity to the shaft, so as to transmit the full power to the shaft, and the operator by setting the cam or wedge at a point where the contact between the cam or wedge and the rollers will be equidistant from the center of the shaft brings the disk or center and its encircling strap or band in concentric relation with the shaft, so that no power is transmitted to the shaft, allowing the engine to run without revolving the shaft. It will thus be seen that the operator can adjust the eccentricity of the crank, formed by the movable disk or center and its tongue or spline, at such point as may be required to transmit the full power of the engine onto the shaft, or nominal power only, or no power at all, and this by merely sliding the cam or wedge to varying positions on the shaft, and consequently varying points of contact for the inclined faces 9 and 10 of the cam or wedge, by which greater or less eccentricity will be given to the disk or center, and consequently a greater or less amount of crank projection for transmitting power.

The device is of simple construction and can be easily manipulated by the operator, and in sliding the cam or wedge to varying positions the antifriction-rollers reduce the frictional contact to a minimum, making the movement of the cam or wedge on the shaft to be easily performed without any inconvenience and without liability of sticking. The movement of the sliding cam or wedge is positive, and with such movement the shifting of the disk or center necessarily follows, as the inclined faces of the cam or wedge act positively against the antifriction-rollers and effect a positive movement of the disk or center, by which the length of crank is changed. The leverage or length of the crank, formed by the movable disk or center and its tongue or spline, extends from a concentric or non-acting position to a leverage equal to the degree of shift for the movable disk or center, and the amount of leverage can be varied to intermediate points between the concentric of the disk or center and the extreme eccentric position of the disk or center to the shaft, thus furnishing a number of operative positions for transmitting power as required for driving the shaft at a decreased or increased speed.

It will be understood that with the wedge or incline 8 set to fix the disk or center 12 concentric with the shaft the rotation of the shaft is stopped with the wedge thus located, and that the advance of the wedge in one direction shifts the disk or center to an eccentric position, so that in operation the shaft will be revolved in a forward direction, and that with the moving of the wedge in the opposite direction from the central position, so as to be rearward, so to speak, the disk or center will be given an eccentricity by which the engine or motor will be reversed and the shaft driven in a reverse direction. It will thus be seen that by means of the sliding wedge the engine or motor can be stopped or can be operated in a direction to give a revolution for the shaft either forward or backward, according to the position of the wedge and the eccentricity of the disk or center, thus enabling the engine or motor to be stopped or shifted, as required, by simply changing the relation between the sliding wedge or incline and the movable disk or center.

What I regard as new, and desire to secure by Letters Patent, is—

1. In a valve-gear, the combination of a shaft, a wedge completely encircling and slidable bodily on the shaft and having opposite engaging inclined faces, a movable disk having a central passage for the slidable wedge, antifriction-rollers within the passage of the disk on opposite sides and in contact with the opposite inclined faces of the wedge, a spline on the face of the movable disk, a head fixed on the shaft and having in its face a groove receiving the spline of the disk and having in its body a channel in line with the central passage of the disk, and a strap encircling the body of the disk, substantially as described.

2. In a valve-gear, the combination of a shaft, a wedge completely encircling and slidable bodily on the shaft and having opposite engaging inclined faces, a movable disk having a central passage for the slidable wedge, antifriction-rollers within the passage of the disk on opposite sides and in contact with the opposite inclined faces of the wedge, a spline on the face of the movable disk, a head fixed on the shaft and having in its face a groove receiving the spline of the disk and having in its body a channel in line with the central passage of the disk, a strap encircling the body of the disk, and means for advancing and receding the wedge, substantially as described.

3. In a valve-gear, the combination of a shaft, a wedge completely encircling and slidable bodily on the shaft and having opposite engaging inclined faces, a movable disk having a central passage for the slidable wedge, antifriction-rollers within the passage of the disk on opposite sides and in contact with the opposite inclined faces of the wedge, a spline on the face of the movable disk, a head fixed on the shaft and having in its face a groove receiving the spline of the disk and having in its body a channel in line with the central passage of the disk, a strap encircling the body of the disk, a collar extending out from the wedge at one end thereof and having annular grooves in its body, and a lever engaging a groove of the collar for advancing and receding the wedge, substantially as described.

4. In a valve-gear, the combination of a shaft, a wedge completely encircling and slidable bodily on the shaft and having opposite engaging inclined faces, a movable disk having a central passage for the slidable wedge and having adjacent to one side a projecting peripheral rim, antifriction-rollers within the passage of the disk on opposite sides and in contact with the opposite inclined faces of the wedge, a spline on the face of the movable disk, a head fixed on the shaft and having in its face a groove receiving the spline of the disk and having in its body a channel in line with the central passage of the disk and forming with its edge face and the peripheral rim of the disk an annular channel, and a strap encircling the body of the disk and located in the annular channel between the rim of the disk and the fixed head, substantially as described.

5. In a valve-gear, the combination of a shaft, a wedge completely encircling and slidable bodily on the shaft and having opposite engaging inclined faces, a movable disk having a central passage for the slidable wedge and having adjacent to one side a projecting peripheral rim, antifriction-rollers within the passage of the disk on opposite sides and in contact with the opposite inclined faces of the wedge, a spline on the face of the movable disk, a head fixed on the shaft and having in its face a groove receiving the spline of the disk and having in its body a channel in line with the central passage of the disk and forming with its edge face and the peripheral rim of the disk an annular channel, a strap encircling the body of the disk and located in the annular channel between the rim of the disk and the fixed head, and a rod or pitman connected with the strap, substantially as described.

6. In a valve-gear, the combination of a shaft, a wedge completely encircling and slidable bodily on the shaft and having opposite engaging inclined faces, a movable disk having a central passage for the slidable wedge and having adjacent to one side a projecting peripheral rim, antifriction-rollers within the passage of the disk on opposite sides and in contact with the opposite inclined faces of the wedge, a spline on the face of the movable disk, a head fixed on the shaft and having in its face a groove receiving the spline of the disk and having in its body a channel in line with the central passage of the disk and forming with its edge face and the peripheral rim of the disk an annular channel, a strap encircling the body of the disk and located in the annular channel between the rim of the disk and the fixed head, a rod or pitman connected with the strap, and means for advancing and receding the wedge, substantially as described.

WILLIAM A. WEBSTER.

Witnesses:
CHAS. M. YOUNG,
J. W. CLENDENIN.